(12) United States Patent
Goubard

(10) Patent No.: US 11,674,057 B2
(45) Date of Patent: Jun. 13, 2023

(54) HEAT-CROSSLINKABLE ADHESIVE COMPOSITION

(71) Applicant: Bostik SA, Colombes (FR)

(72) Inventor: David Goubard, Strasbourg (FR)

(73) Assignee: BOSTIK SA, Colombes (FR)

( * ) Notice: Subject to any disclaimer, the term of this patent is extended or adjusted under 35 U.S.C. 154(b) by 500 days.

(21) Appl. No.: 16/633,596

(22) PCT Filed: Jul. 26, 2018

(86) PCT No.: PCT/FR2018/051911
§ 371 (c)(1),
(2) Date: Jan. 24, 2020

(87) PCT Pub. No.: WO2019/020943
PCT Pub. Date: Jan. 31, 2019

(65) Prior Publication Data
US 2021/0071040 A1   Mar. 11, 2021

(30) Foreign Application Priority Data
Jul. 28, 2017 (FR) ...................................... 1757229

(51) Int. Cl.
| | | |
|---|---|---|
| *C09J 7/35* | (2018.01) | |
| *C08G 18/75* | (2006.01) | |
| *C08G 18/76* | (2006.01) | |
| *C08G 77/458* | (2006.01) | |
| *C08L 75/06* | (2006.01) | |
| *C09J 175/04* | (2006.01) | |

(52) U.S. Cl.
CPC ............. *C09J 7/35* (2018.01); *C08G 18/755* (2013.01); *C08G 18/7621* (2013.01); *C08G 77/458* (2013.01); *C08L 75/06* (2013.01); *C09J 175/04* (2013.01); *C08G 2170/40* (2013.01); *C08L 2201/10* (2013.01); *C08L 2205/025* (2013.01); *C08L 2205/03* (2013.01); *C08L 2312/00* (2013.01); *C09J 2301/122* (2020.08); *C09J 2475/00* (2013.01)

(58) Field of Classification Search
CPC ................................ C08G 18/718; C09J 7/35
See application file for complete search history.

(56) References Cited

U.S. PATENT DOCUMENTS

| | | | |
|---|---|---|---|
| 4,408,021 A | 10/1983 | Howard | |
| 5,238,763 A * | 8/1993 | Sullivan | ................ G03G 5/142 430/58.65 |
| 9,493,690 B2 * | 11/2016 | Goubard | ............... C08G 18/227 |
| 11,160,764 B2 * | 11/2021 | Haddleton | ............... A61P 25/18 |
| 2010/0029860 A1 * | 2/2010 | Honma | ............... C08G 18/7657 525/452 |
| 2011/0171465 A1 * | 7/2011 | Yasuda | ..................... B32B 7/12 428/355 R |
| 2012/0298300 A1 * | 11/2012 | Oertli | ..................... C09J 175/08 524/588 |
| 2015/0118489 A1 | 4/2015 | Laferte et al. | |
| 2015/0118490 A1 * | 4/2015 | Laferte | .................. C09J 171/00 428/355 N |

FOREIGN PATENT DOCUMENTS

EP     2865694 A1     4/2015

OTHER PUBLICATIONS

Todea et al. Polymers (Basel). Dec. 2021; 13(23): 4091.Published online Nov. 24, 2021. doi: 10.3390/polym13234091. Evidentiary Reference. (Year: 2021).*
ISA/EP; International Search Report and Written Opinion for International Patent Application No. PCT/FR2018/051911 dated Nov. 29, 2018, 12 pages.

* cited by examiner

*Primary Examiner* — Michael M Dollinger
(74) *Attorney, Agent, or Firm* — NK Patent Law

(57) ABSTRACT

The present invention relates to a heat-crosslinkable adhesive composition comprising: —from 20% to 84% by weight of composition (A); —from 15% to 79% by weight of a compatible tackifying resin (B), —from 0.01% to 5% by weight of a crosslinking catalyst (C). The invention also relates to a self-adhesive item obtained by preheating said composition, coating on a support layer, then crosslinking by heating.

20 Claims, No Drawings

HEAT-CROSSLINKABLE ADHESIVE COMPOSITION

CROSS-REFERENCE TO RELATED APPLICATIONS

This application is a U.S. National Stage application of International Patent Application No. PCT/FR2018/051911, filed on Jul. 26, 2018, which claims the benefit of French Patent Application No. 1757229, filed on Jul. 28, 2017.

FIELD OF THE INVENTION

A subject matter of the present invention is a heat-crosslinkable adhesive composition, and a self-adhesive article comprising a support layer coated with a self-adhesive layer consisting of said crosslinked adhesive composition.

TECHNICAL BACKGROUND

Pressure-sensitive adhesives (PSAs) are substances which confer, on the support which is coated with them, an immediate tack at ambient temperature, which makes possible its instantaneous adhesion to a substrate under the effect of a gentle and brief pressure. PSAs are widely used in the manufacture of self-adhesive labels which are attached to articles for purposes of presentation of information (such as barcode, name, price) and/or for decorative purposes, whether during definitive or temporary adhesive bonding operations. PSAs are also employed in the manufacture of self-adhesive tapes of varied uses. Mention may be made, for example, besides the transparent adhesive tape widely used in daily life, of: the forming and the assembling of cardboard packagings; the protection of surfaces for painting operations, in the construction industry; the fixing and the maintenance of various elements, such as panels, bricks, protruding objects, in the construction of buildings or edifices; the fixing and the maintenance of metal, plastic or glass parts, flat or having a specific profile, such as electric cables, plastic films, window panes, metal sheets, inscriptions, logos, parts of seats, dashboards, plastic or textile walls, conduits or pipes for the circulation of fluids, in particular in the transportation industry; the adhesive bonding of fitted carpets by double-sided adhesive tapes.

For the purpose of the manufacture of self-adhesive labels and/or tapes, PSAs are often applied by continuous coating processes over the whole of the surface of a large-sized support layer (if appropriate printable), in the proportion of an amount (generally expressed in g/m$^2$) denoted below by the term of "weight per unit area". The support layer consists of paper or of film of a polymeric material having one or more layers. The adhesive layer which covers the support layer can itself be covered with a nonstick protective layer (often called release liner), for example consisting of a silicone film. The multilayer system obtained is generally packaged by winding in the form of large reels having a width of up to 2 m and having a diameter of 1 m, which can be stored and transported.

These multilayer systems can subsequently be converted into self-adhesive labels which can be applied by the end user, by means of transformation processes which include the printing of desired informative and/or decorative elements onto the printable surface of the support layer, followed by cutting to the desired shape and sizes. The nonstick protective layer can be readily removed without modifying the adhesive layer, which remains attached to the support layer. After separation from its nonstick protective layer, the label is applied to the article to be coated either manually or with the aid of labeling machines on automated packaging lines.

These multilayer systems can also be converted into self-adhesive tapes by cutting and packaging as rolls of predetermined width and length.

PSAs make possible, due to their high room-temperature tack, rapid holding or attachment of the self-adhesive label and/or tape to the substrate (or article) to be coated (for example, as regards labels, on bottles, or else, as regards tapes, on packing boards to be formed), suitable for the achievement of high industrial production rates.

There exists a field of application of PSAs for which it is desirable for the adhesiveness of the labels and/or tapes on the substrate to be also maintained when the adhesive joint providing the attachment is exposed (likewise, consequently, when the article coated with the label and/or the tape) to a temperature capable of varying within a wide range. Mention may be made, by way of example, of the positioning of labels on certain components of motor vehicles (or other vehicles) located close to the engine, or on packing materials designed to receive a hot liquid during their packaging, or else on articles (such as tyres) which are labelled when hot, on departing from the manufacturing lines. Mention may also be made of the use of self-adhesive tapes for the assembling of parts for which a good thermal resistance is necessary, as in the case, for example, of the interior trim of planes or other vehicles.

PSAs often used for this field of application comprise polymers (or copolymers) of the acrylate type of very high molar mass. The latter are provided in the form of an aqueous emulsion or of an organic solution. However, the coating of such PSAs on a support layer is complicated, at the industrial level, by the fact that it is necessary to provide either an additional stage of drying of the emulsion, or specific plants, taking into account the problems of industrial health and safety related to the evaporation of the organic solvent. In both cases, the disadvantages related to the unpleasant smell of the acrylic monomers or polymers also has to be taken into account.

PSAs which comprise neither solvent nor water are known. Thus, hot-melt pressure-sensitive adhesives (HMPSAs) are substances, solid at ambient temperature, which are deposited (or coated) on the support in the molten state, and provide the latter, after cooling, with a high tack and high adhesiveness on varied substrates. However, the corresponding compositions generally comprise a thermoplastic polymer, so that the adhesive joint providing the attachment of the support to the substrate does not exhibit, at elevated temperature, all the cohesion necessary for the field of application targeted above.

There thus exists a need for novel heat-crosslinkable adhesive compositions which result, after coating on a support and then crosslinking, in an adhesive joint (providing the attachment of the self-adhesive article thus obtained to a substrate) which retains the required cohesion over a broad temperature range, in particular at elevated temperature.

DESCRIPTION OF THE INVENTION

The present invention relates to a heat-crosslinkable adhesive composition comprising:
from 20% to 84% by weight of a composition (A) comprising:

from 75% to 100% by weight of at least one polyurethane comprising two end groups of alkoxysilane type which are hydrolyzable and having the following formula (I):

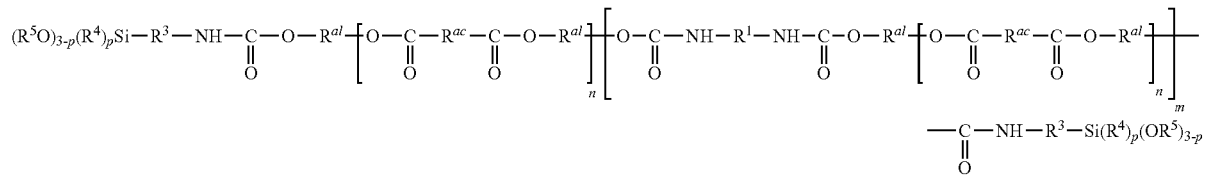

in which:
- $R^1$ represents a divalent hydrocarbon radical comprising from 5 to 15 carbon atoms which can be aromatic or aliphatic and linear, branched or cyclic;
- $R^{al}$ represents a divalent hydrocarbon radical resulting from a saturated diol, by replacement of each of the two hydroxyl groups by a free valency, said diol having a hydroxyl number $I_{OH}$ of greater than 220 mg KOH/g;
- $R^{ac}$ represents a divalent hydrocarbon radical resulting from a saturated dicarboxylic acid, by replacement of each of the two carboxyl —COOH groups by a free valency, said acid having an acid number $I_A$ of greater than 200 mg KOH/g;
- n is a number such that the polyester diol of formula (III):

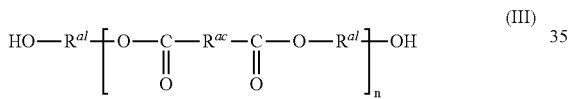

has a hydroxyl number $I_{OH}$ of between 4 and 24 mg KOH/g, preferably between 9 and 24 mg KOH/g;
- $R^3$ represents a linear divalent alkylene radical comprising from 1 to 3 carbon atoms;
- $R^4$ and $R^5$, which are identical or different, each represent a linear or branched alkyl radical of 1 to 4 carbon atoms, with the possibility, when there are several $R^4$ (or $R^5$) radicals, that the latter are identical or different;
- m is an integer such that the number-average molar mass of the polymer of formula (I) is between 400 g/mol and 50 000 g/mol;
- p is an integer equal to 0, 1 or 2;

from 0% to 25% by weight of at least one polyurethane comprising one end group of alkoxysilane type which is hydrolyzable and having the following formula (II):

in which:
- $n_1$ and $m_1$ are each integers such that the number-average molar mass of the polyurethane of formula (II) is between 400 g/mol and 50 000 g/mol;
- $R^{ac}$ and $R^{al}$ are as defined above; and
- R represents a monovalent hydrocarbon radical resulting from a monol, by replacement of the hydroxyl group by a free valency;

said composition (A) being obtained by a process which comprises a stage of preparation of a composition (A-1) comprising an amorphous polyester diol of abovementioned formula (III) or a mixture of amorphous polyester diols of abovementioned formula (III), by reacting, by a polycondensation reaction:
  (i) a composition (A-1-1) comprising at least one saturated dicarboxylic acid, said composition (A-1-1) having an acid number $I_A$ of greater than 200 mg KOH/g; and
  (ii) a composition (A-1-2) comprising at least one saturated diol, said composition (A-1-2) having a hydroxyl number $I_{OH}$ of greater than 220 mg KOH/g;
  provided that at least one saturated dicarboxylic acid of the composition (A-1-1) or at least one saturated diol of the composition (A-1-2) is branched; and
  (iii) optionally a composition (A-1-3) comprising at least one monol;

the composition (A-1) having a hydroxyl number $I_{OH}$ of between 4 and 24 mg KOH/g, preferably between 9 and 24 mg KOH/g;

from 15% to 79% by weight of a compatible tackifying resin (B), preferably with a number-average molar mass of between 200 g/mol and 50 000 g/mol, and preferentially chosen from the following resins:
  (i) capable of being obtained by polymerization of terpene hydrocarbons and phenols, in the presence of Friedel-Crafts catalyst(s);
  (ii) capable of being obtained by polymerization of α-methylstyrene, and optionally by reaction with phenols;
  (iii) rosins of natural origin or modified rosins (such as, for example, the rosin extracted from pine gum, wood rosin extracted from tree roots) and their derivatives which are hydrogenated, dimerized, polymerized or esterified by monoalcohols or polyols (such as, for example, glycerol or pentaerythritol);

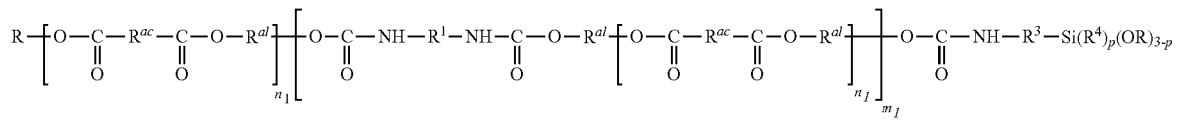

(iv) acrylic resins having in particular a viscosity at 100° C. of less than 100 Pa·s; and (v) their mixtures;

from 0.01% to 5%, preferably from 0.01% to 3%, by weight, of a crosslinking catalyst (C).

In the context of the invention, the amounts expressed in the form of percentages correspond to weight/weight percentages. For example, the adhesive composition of the invention comprises from 20% to 84% by weight of a composition (A), with respect to the total weight of said adhesive composition.

In the present text:

the number-average molar masses shown for the polymers are determined by gel permeation chromatography in THF (or GPC, also known as size exclusion chromatography or SEC), with calibration with respect to a certified external molecular weight standard polystyrene;

the acid number $I_A$ of a dicarboxylic acid is the number of carboxyl functional groups per gram of acid, said number being expressed in the form of equivalent in milligrams of KOH necessary to neutralize the acidity of 1 g of acid, determined by titrimetry, said number being linked to the number-average molar mass M of said acid by the following relationship:

$$I_A = (56.1 \times 2 \times 1000)/M$$

the hydroxyl number $I_{OH}$ of a diol is the number of hydroxyl functional groups per gram of diol, said number being expressed in the form of equivalent in milligrams of KOH used in the assay of the hydroxyl functional groups, determined by titrimetry according to the standard ISO 14900:2001, said number being linked to the number-average molar mass M' of said diol by the relationship:

$$I_{OH} = (56.1 \times 2 \times 1000)/M'$$

the viscosities shown are measured according to the standard DIN ISO 2555 with a Brookfield RTV viscometer, optionally equipped (according to the measurement temperature) with a Thermosel system.

1. Composition (A)

Process for the Preparation of the Composition (A)

The composition (A) according to the invention can be prepared according to a process in several sequential stages:

1$^{st}$ Stage: Preparation of a Composition (A-1) Having a Hydroxyl Number $I_{OH}$ of Between 4 and 24 mg KOH/g The composition (A-1) is obtained by a polycondensation reaction between:

a saturated dicarboxylic acid or a mixture of saturated dicarboxylic acids in a composition (A-1-1), said composition (A-1-1) having an acid number $I_A$ of greater than 200 mg KOH/g; and a saturated diol or a mixture of saturated diols in a composition (A-1-2), said composition (A-1-2) having a hydroxyl number $I_{OH}$ of greater than 220 mg KOH/g; and optionally a monol or a mixture of monols in a composition (A-1-3);

provided that at least one saturated dicarboxylic acid of the composition (A-1-1) or at least one saturated diol of the composition (A-1-2) is branched.

The hydroxyl number $I_{OH}$ of the composition (A-1) represents the number of hydroxyl functional groups per gram of composition (A-1), said number being expressed in the form of equivalent in milligrams of KOH used in the assay of the hydroxyl functional groups, determined experimentally by titrimetry according to the standard ISO 14900: 2001. In the case where the composition (A-1) is a mixture of polyols, the $I_{OH}$ can also be calculated from the known $I_{OH}$ values of each of the polyols and from their respective contents by weight in said mixture.

Dicarboxylic Acid(s)

According to the invention, the saturated dicarboxylic acid(s) of the composition (A-1-1) has (have) an acid number $I_A$ of greater than 200 mg KOH/g.

Preferably, the saturated dicarboxylic acid(s) of the composition (A-1-1) has (have) an acid number $I_A$ of greater than or equal to 300 mg KOH/g, preferably of greater than or equal to 400 mg KOH/g, preferentially of greater than or equal to 500 mg KOH/g, in particular of greater than or equal to 700 mg KOH/g and advantageously of greater than or equal to 800 mg KOH/g.

Preferably, the saturated dicarboxylic acid(s) of the composition (A-1-1) has (have) an acid number $I_A$ equal to 555 mg KOH/g or equal to 768 mg KOH/g.

When the composition (A-1-1) comprises a mixture of dicarboxylic acids, it is understood that each dicarboxylic acid of the mixture has an acid number $I_A$ as defined above.

The dicarboxylic acid can be linear or branched, preferably linear.

The dicarboxylic acid can be aliphatic or cycloaliphatic.

Preferably, the dicarboxylic acid is not a dimerized fatty acid.

The dicarboxylic acid according to the invention can be chosen from the group consisting of malonic acid, succinic acid, fumaric acid, glutaric acid, adipic acid, 1,3- or 1,4-cyclohexanedicarboxylic acid, 3-methyl-1,5-pentanedicarboxylic acid, 1,10-decanedicarboxylic acid, 1,12-dodecanedicarboxylic acid, 1,18-octadecanedicarboxylic acid, methyltetrahydrophthalic acid, hexahydrophthalic acid, tetrahydrophthalic acid, azelaic acid, sebacic acid and their mixtures.

Preferably, the dicarboxylic acid is adipic acid.

Preferably, the dicarboxylic acid is sebacic acid.

The abovementioned composition (A-1-1) can have an acid number $I_A$ of greater than or equal to 300 mg KOH/g, preferably of greater than or equal to 400 mg KOH/g, preferentially of greater than or equal to 500 mg KOH/g, in particular of greater than or equal to 700 mg KOH/g and advantageously of greater than or equal to 800 mg KOH/g.

The acid number $I_A$ of the composition (A-1-1) is the number of carboxyl functional groups per gram of composition (A-1-1), said number being expressed in the form of equivalent in milligrams of KOH necessary to neutralize the acidity of 1 g of acid, determined by titrimetry according to the standards EN 1241: 1998 (typically short-chain acids) or EN ISO 660: 2009 (typically long-chain acids), as a function in particular of the hydrophilic/lipophilic balance of the composition (A-1-1). In the case where the composition (A-1-1) is a mixture of diacids, the $I_A$ can also be calculated from the known $I_A$ values of each of the diacids and from their respective contents by weight in said mixture.

Diol(s)

According to the invention, the saturated diol(s) of the composition (A-1-2) has (have) a hydroxyl number $I_{OH}$ of greater than 220 mg KOH/g.

Preferably, the saturated diol(s) of the composition (A-1-2) has (have) a hydroxyl number $I_{OH}$ of greater than or equal to 500 mg KOH/g, preferably of greater than or equal to 700 mg KOH/g, more preferentially still of greater than or equal to 900 mg KOH/g.

Preferably, the saturated diol(s) of the composition (A-1-2) has (have) a hydroxyl number $I_{OH}$ equal to 950 mg KOH/g, or equal to 1078 mg KOH/g, or equal to 1808 mg KOH/g.

When the composition (A-1-2) comprises a mixture of saturated diols, it is understood that each diol of the mixture has a hydroxyl number $I_{OH}$ as defined above.

The diol employed can be aromatic or aliphatic (preferably aliphatic) and linear or branched, preferably branched.

According to one embodiment, at least one saturated diol of the composition (A-1-2) is branched; preferably, all the saturated diols as a mixture in the composition (A-1-2) are branched.

Preferably, the diol is not a dimerized fatty diol.

The diol according to the invention can be chosen from the group consisting of ethylene glycol (CAS: 107-21-1), diethylene glycol, triethylene glycol, tetraethylene glycol, 1,2-propanediol, dipropylene glycol, tripropylene glycol, tetrapropylene glycol, 1,6-hexanediol, 3-ethyl-2-methyl-1,5-pentanediol, 2-ethyl-3-propyl-1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl-3-ethyl-2-propyl-1,5-pentanediol, 2,3-dipropyl-4-ethyl-2-methyl-1,5-pentanediol, 2-butyl-2-ethyl-1,5-pentanediol, 2-butyl-2,3-diethyl-4-methyl-1,5-pentanediol, 2-butyl-2,4-diethyl-3-propyl-1,5-pentanediol, 3-butyl-2-propyl-1,5-pentanediol, 2-methyl-1,5-pentanediol (CAS: 42856-62-2), 3-methyl-1,5-pentanediol (MPD, CAS: 4457-71-0), 2,2-dimethyl-1,3-pentanediol (CAS: 2157-31-5), 2,2-dimethyl-1,5-pentanediol (CAS: 3121-82-2), 3,3-dimethyl-1,5-pentanediol (CAS: 53120-74-4), 2,3-dimethyl-1,5-pentanediol (CAS: 81554-20-3), 2,2-dimethyl-1,3-propanediol (neopentyl glycol—NPG, CAS: 126-30-7), 2,2-diethyl-1,3-propanediol (CAS: 115-76-4), 2-methyl-2-propyl-1,3-propanediol (CAS: 78-26-2), 2-butyl-2-ethyl-1,3-propanediol (CAS: 115-84-4), 2-methyl-1,3-propanediol (CAS: 2163-42-0), 2-benzyloxy-1,3-propanediol (CAS: 14690-00-7), 2,2-dibenzyl-1,3-propanediol (CAS: 31952-16-6), 2,2-dibutyl-1,3-propanediol (CAS: 24765-57-9), 2,2-diisobutyl-1,3-propanediol, 2,4-diethyl-1,5-pentanediol, 2-ethyl-1,6-hexanediol (CAS: 15208-19-2), 2,5-dimethyl-1,6-hexanediol (CAS: 49623-11-2), 5-methyl-2-(1-methylethyl)-1,3-hexanediol (CAS: 80220-07-1), 1,4-dimethyl-1,4-butanediol, 1,5-hexanediol (CAS: 928-40-5), 3-methyl-1,6-hexanediol (CAS: 4089-71-8), 3-(tert-butyl)-1,6-hexanediol (CAS: 82111-97-5), 1,3-heptanediol (CAS: 23433-04-7), 1,2-octanediol (CAS: 1117-86-8), 1,3-octanediol (CAS: 23433-05-8), 2,2,7,7-tetramethyl-1,8-octanediol (CAS: 27143-31-3), 2-methyl-1,8-octanediol (CAS: 109359-36-6), 2,6-dimethyl-1,8-octanediol (CAS: 75656-41-6), 1,7-octanediol (CAS: 3207-95-2), 4,4,5,5-tetramethyl-3,6-dioxa-1,8-octanediol (CAS: 76779-60-7), 2,2,8,8-tetramethyl-1,9-nonanediol (CAS: 85018-58-2), 1,2-nonanediol (CAS: 42789-13-9), 2,8-dimethyl-1,9-nonanediol (CAS: 40326-00-9), 1,5-nonanediol (CAS: 13686-96-9), 2,9-dimethyl-2,9-dipropyl-1,10-decanediol (CAS: 85018-64-0), 2,9-dibutyl-2,9-dimethyl-1,10-decanediol (CAS: 85018-65-1), 2,9-dimethyl-2,9-dipropyl-1,10-decanediol (CAS: 85018-64-0), 2,9-diethyl-2,9-dimethyl-1,10-decanediol (CAS: 85018-63-9), 2,2,9,9-tetramethyl-1,10-decanediol (CAS: 35449-36-6), 2-nonyl-1,10-decanediol (CAS: 48074-20-0), 1,9-decanediol (CAS: 128705-94-2), 2,2,6,6,10,10-hexamethyl-4,8-dioxa-1,11-undecanediol (CAS: 112548-49-9), 1-phenyl-1,11-undecanediol (CAS: 109217-58-5), 2-octyl-1,11-undecanediol (CAS: 48074-21-1), 2,10-diethyl-2,10-dimethyl-1,11-undecanediol (CAS: 85018-66-2), 2,2,10,10-tetramethyl-1,11-undecanediol (CAS: 35449-37-7), 1-phenyl-1,11-undecanediol (CAS: 109217-58-5), 1,2-undecanediol (CAS: 13006-29-6), 1,2-dodecanediol (CAS: 1119-87-5), 2,11-dodecanediol (CAS: 33666-71-6), 2,11-diethyl-2,11-dimethyl-1,12-dodecanediol (CAS: 85018-68-4), 2,11-dimethyl-2,11-dipropyl-1,12-dodecanediol (CAS: 85018-69-5), 2,11-dibutyl-2,11-dimethyl-1,12-dodecanediol (CAS: 85018-70-8), 2,2,11,11-tetramethyl-1,12-dodecanediol (CAS: 5658-47-9), 1,11-dodecanediol (CAS: 80158-99-2), 11-methyl-1,7-dodecanediol (CAS: 62870-49-9), 1,4-dodecanediol (CAS: 38146-95-1), 1,3-dodecanediol (CAS: 39516-24-0), 1,10-dodecanediol (CAS: 39516-27-3), 2,11-dimethyl-2,11-dodecanediol (CAS: 22092-59-7), 1,5-dodecanediol (CAS: 20999-41-1), 6,7-dodecanediol (CAS: 91635-53-9) and their mixtures.

Preferably, the diol is chosen from the group consisting of ethylene glycol (CAS: 107-21-1), 1,6-hexanediol, 3-methyl-1,5-pentanediol (MPD, CAS: 4457-71-0), 2,2-dimethyl-1,3-propanediol (neopentyl glycol—NPG, CAS: 126-30-7) and their mixtures.

Preferably, the composition (A-1-2) comprises (preferably consists of) neopentyl glycol, ethylene glycol and 1,6-hexanediol.

Preferably, the composition (A-1-2) comprises (preferably consists of) 3-methyl-1,5-pentanediol.

The abovementioned composition (A-1-2) can have a hydroxyl number $I_{OH}$ of greater than or equal to 500 mg KOH/g, preferably of greater than or equal to 700 mg KOH/g, more preferentially still of greater than or equal to 900 mg KOH/g.

The hydroxyl number $I_{OH}$ of the composition (A-1-2) is the number of hydroxyl functional groups per gram of composition (A-1-2), said number being expressed in the form of equivalent in milligrams of KOH per gram of product used in the assay of the hydroxyl functional groups, determined by titrimetry according to the standard ISO 14900:2001. In the case where the composition (A-1-2) is a mixture of diols, the $I_{OH}$ can also be calculated from the known $I_{OH}$ values of each of the diols and from their respective contents by weight in said mixture.

Monol(s)

According to the invention, the monol(s) of the composition (A-1-3) can be any alcohol(s) comprising a single hydroxyl group, being saturated or unsaturated, linear or branched and aromatic, aliphatic or cycloaliphatic, and comprising from 1 to 22 carbon atoms, preferably from 8 to 18 carbon atoms.

Preferably, the monol is a saturated aliphatic monol chosen from the group consisting of methanol, ethanol, propanol, isopropanol, butanol, isobutanol, pentanol, isopentanol, hexanol, heptanol, benzyl alcohol, n-octanol, 2-ethylhexanol, nonan-1-ol, decan-1-ol, undecanol, undecenol, dodecan-1-ol, isotridecanol, saturated or unsaturated $C_{10}$ to $C_{22}$ fatty alcohols, $C_8$ to $C_{13}$ oxo alcohols and their mixtures.

A person skilled in the art typically knows the amounts of the different compounds (diol(s), acid(s) and optionally monol(s)) to be employed in order to obtain a composition (A-1) having a $I_{OH}$ of between 4 and 24 mg KOH/g.

It is possible, for example, to react (a) dicarboxylic acid(s) with a stoichiometric excess of diol(s).

Typically, the diol(s)/monol(s) molar ratio employed can be chosen such that the composition (A) comprises a maximum of 25% by weight of polymer of formula (II).

Preferably, the diol(s)/monol(s) molar ratio is between 80/20 and 100/0, preferably between 90/10 and 100/0.

Composition (A-1)

Preferably, the composition (A-1) is obtained by a polycondensation reaction between:
- a saturated dicarboxylic acid or a mixture of saturated dicarboxylic acids in a composition (A-1-1), said composition (A-1-1) having an acid number $I_A$ of greater than 200 mg KOH/g; and
- a saturated diol or a mixture of saturated diols in a composition (A-1-2), said composition (A-1-2) having a hydroxyl number $I_{OH}$ of greater than 220 mg KOH/g;

provided that at least one saturated dicarboxylic acid of the composition (A-1-1) or at least one saturated diol of the composition (A-1-2) is branched.

Preferably, the abovementioned composition (A-1) is obtained by a polycondensation reaction between:
- adipic acid; and
- a mixture of neopentyl glycol, ethylene glycol and 1,6-hexanediol;

or between:
- adipic acid; and
- 3-methyl-1,5-pentanediol.

The abovementioned composition (A-1) comprises an amorphous polyester diol of abovementioned formula (III) or a mixture of amorphous polyester diols of abovementioned formula (III).

In particular, when the composition (A-1-1) comprises a mixture of dicarboxylic acids and/or when the composition (A-1-2) comprises a mixture of diols, the composition (A-1) formed then comprises a mixture of amorphous polyester diols of abovementioned formula (III).

According to the invention, the amorphous polyester diol of formula (III) has a hydroxyl number $I_{OH}$ of between 4 and 24 mg KOH/g, preferentially between 7 and 24 mg KOH/g, preferably between 7 and 20 mg KOH/g and in particular between 9 and 19 mg KOH/g. Preferably, the hydroxyl number $O_{OH}$ is between 9 and 24 mg KOH/g.

The amorphous polyester diol of formula (III) of the composition (A-1) can have a viscosity, measured at 23° C., of less than 10 000 Pa·s, preferably of less than 1000 Pa·s, preferentially of less than or equal to 700 Pa·s, more preferentially of less than or equal to 690 Pa·s, more preferentially still of less than or equal to 500 Pa·s, in particular of less than or equal to 250 Pa·s, for example of less than or equal to 190 Pa·s, in particular of less than or equal to 100 Pa·s.

The amorphous polyester diol of formula (III) can have a glass transition temperature $T_g$ of less than 0° C., preferably of less than or equal to −20° C., preferably of less than or equal to −40° C., preferentially of less than or equal to −50° C., in particular of less than or equal to −60° C., for example of less than or equal to −64° C.

The glass transition temperature (Tg) can be measured in a well-known way, for example according to the standard ASTM E1356-08.

The amorphous polyester diol of formula (III) can have a number-average molar mass of greater than or equal to 5500 g/mol, preferably of greater than or equal to 6000 g/mol, in particular strictly of greater than 6000 g/mol, preferentially of greater than or equal to 8000 g/mol, in particular of greater than or equal to 9000 g/mol, for example of greater than or equal to 10 000 g/mol, advantageously of greater than or equal to 12 000 g/mol and in particular of greater than or equal to 18 000 g/mol.

The number-average molar mass of the amorphous polyester diol of formula (III) can be determined from its $O_{OH}$ and from its functionality.

Mention may be made, among the amorphous polyester diols of formula (III), for example, of Dynacoll® 7250 sold by Evonik (polyester polyol having a viscosity of 180 Pa·s at 23° C., a number-average molar mass $M_n$ equal to 5500 g/mol and a $T_g$ equal to −50° C.), Kuraray® P-6010 sold by Kuraray (polyester polyol having a viscosity of 68 Pa·s at 23° C., a number-average molar mass equal to 6000 g/mol and a $T_g$ equal to −64° C.) or Kuraray® P-10010 sold by Kuraray (polyester polyol having a viscosity of 687 Pa·s at 23° C. and a number-average molar mass equal to 10 000 g/mol).

The composition (A-1) can additionally comprise at least one amorphous polyester monol of following formula (IV):

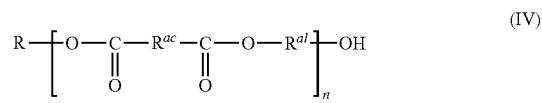

as defined above.

In the above formula (IV), R can represent a monovalent hydrocarbon radical comprising from 1 to 22 carbon atoms; preferably, R represents a methyl radical.

The amorphous polyester monol of formula (IV) can have a hydroxyl number $I_{OH}$ of between 2 and 12 mg KOH/g, preferably between 4.5 and 12 mg KOH/g.

The amorphous polyester monol of formula (IV) can have a viscosity of less than 1000 Pa·s at 23° C., preferably of less than 700 Pa·s, more preferably still of less than 500 Pa·s.

The amorphous polyester monol of formula (IV) can have a glass transition temperature $T_g$ of less than 0° C., preferably of less than or equal to −20° C., preferably of less than or equal to −40° C., preferentially of less than or equal to −50° C., in particular of less than or equal to −60° C.

Preferably, when the composition (A-1) comprises at least one amorphous polyester monol of abovementioned formula (IV), said composition (A-1) is obtained by a polycondensation reaction between:
- a saturated dicarboxylic acid or a mixture of saturated dicarboxylic acids in a composition (A-1-1), said composition (A-1-1) having an acid number $I_A$ of greater than 200 mg KOH/g; and
- a saturated diol or a mixture of saturated diols in a composition (A-1-2), said composition (A-1-2) having a hydroxyl number $I_{OH}$ of greater than 220 mg KOH/g; and
- a monol or a mixture of monols in a composition (A-1-3).

The composition (A-1) can comprise:
- from 75% to 100%, in particular from 95% to 100%, by weight, of at least one polyester diol of formula (III) as defined above; and
- from 0% to 25%, in particular from 0% to 5%, by weight, of at least one polyester monol of abovementioned formula (IV).

According to one embodiment, the composition (A-1) has a hydroxyl number $I_{OH}$ of between 7 and 24 mg KOH/g, preferably between 7 and 20 mg KOH/g and in particular between 9 and 19 mg KOH/g.

2nd Stale: Preparation of a Composition (A) Comprising at Least 75% by Weight of Polyurethanes Having Alkoxysilane End Groups of Formula (I):

Alternative form (i): According to this first alternative form, the abovementioned composition (A-1) can be reacted with the isocyanatosilane of formula (VII):

in a proportion of an amount corresponding to a molar equivalent ratio of the number of NCO functional groups/ number of OH functional groups of between 0.90 and 1.05 and preferably equal to approximately 1.

The abovementioned isocyanatosilanes of formula (VII) are widely available commercially. Mention may in particular be made of Silquest® A-Link 35, i.e. (3-isocyanatopropyl)trimethoxysilane, available from Momentive, Silquest® A-Link 25, i.e. (3-isocyanatopropyl)triethoxysilane, available from Momentive, (3-isocyanatopropyl)methyldimethoxysilane, available from Gelest, Geniosil® XL 42, i.e. (3-isocyanatomethyl)methyldimethoxysilane, available from Wacker, and Geniosil® XL 43, i.e. (3-isocyanatomethyl)trimethoxysilane, available from Wacker.

Polyurethanes having alkoxysilane end groups of formula (I) included in a proportion of at least 75% by weight in the composition (A), preferably in a proportion of at least 90% by weight, preferentially of at least 95% by weight, in the composition (A), are thus obtained.

These preferred forms are typically obtained by using the isocyanatosilane having the appropriate formula (VII).

This stage is in particular carried out under anhydrous conditions, so as to prevent hydrolysis of the alkoxysilane groups. A typical temperature range for carrying out this reaction stage is from 30° C. to 120° C. and more particularly from 60° C. to 105° C.

Alternative Form (ii):

According to this second alternative form, the composition (A) can be obtained in two stages from the composition (A-1):

Stage (ii-A): Preparation of a Composition (A-2) Comprising at Least 85% by Weight of at Least One Polyurethane Having Hydroxyl End Groups In particular, the composition (A-1) obtained above is reacted with the diisocyanate of following formula (V):

NCO—R$^1$—NCO         (V)

in amounts corresponding to a molar equivalent ratio of the number of NCO functional groups/number of OH functional groups of between 0.3 and 0.7 and preferably equal to approximately 0.5;

so as to obtain polyurethanes having hydroxyl end groups of following formula (VI):

a) the divalent radical derived from isophorone diisocyanate (IPDI):

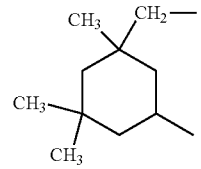

b)

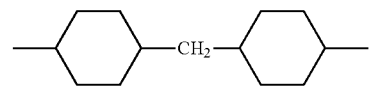

c) the radical derived from 2, 4- and 2, 6-toluene diisocyanate (TDI):

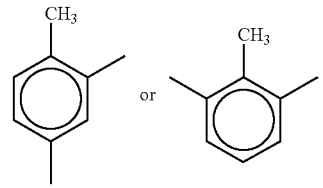

d) the radical derived from 4, 4'- and 2, 4'-diphenylmethane diisocyanate (MDI):

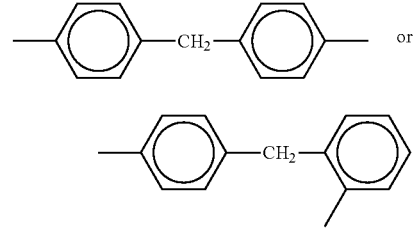

e) the radical derived from m-xylylene diisocyanate (m-XDI):

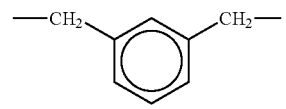

f) the radical derived from hexamethylene diisocyanate (HDI):

Preferably, the radical is the divalent radical derived from isophorone diisocyanate or from xylylene diisocyanate.

(VI)

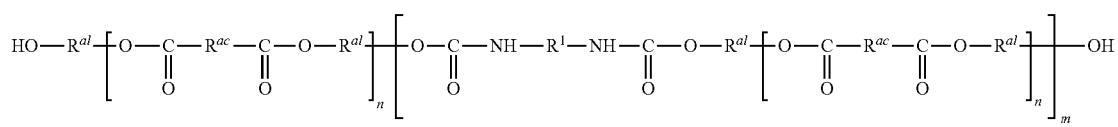

in which, preferably, m is less than or equal to 10.

However, there may also remain, on conclusion of this 3$^{rd}$ stage, unreacted polyester diols of formula (III) of the initial composition (A-1), so that the composition (A-2) may also comprise a residual amount of said polyester diols.

The polyurethanes having hydroxyl end groups of formula (VI) are preferably included in the composition (A-2) in a proportion of at least 90% by weight, preferably of at least 95% by weight, with respect to the total weight of said composition (A-2).

According to one embodiment, the R$^1$ radical is chosen from one of the following divalent radicals, the formulae of which below show the two free valencies:

The polyurethanes having hydroxyl end groups of abovementioned formula (VI) can have a viscosity, measured at 25° C., of less than 20 000 Pa·s, preferentially of less than 1600 Pa·s, preferably of less than or equal to 1000 Pa·s.

Stage (ii-B): Achievement of the Composition (A) Comprising at Least 75% by Weight of Polyurethanes Having Alkoxysilane End Groups of Formula (I):

The composition (A-2) of polyurethanes having hydroxyl end groups obtained in the 2nd stage can be reacted with the isocyanatosilane of formula (VII):

NCO—R$^3$—Si(R$^4$)$_p$(OR$^5$)$_{3-p}$         (VII)

in a proportion of an amount corresponding to a molar equivalent ratio of the number of NCO functional groups/ number of OH functional groups of between 0.90 and 1.05 and preferably equal to approximately 1.

The abovementioned isocyanatosilanes of formula (VII) are widely available commercially. Mention may in particular be made of Silquest® A-Link 35, i.e. (3-isocyanatopropyl)trimethoxysilane, available from Momentive, Silquest® A-Link 25, i.e. (3-isocyanatopropyl)triethoxysilane, available from Momentive, (3-isocyanatopropyl)methyldimethoxysilane, available from Gelest, Geniosil® XL 42, i.e. (3-isocyanatomethyl)methyldimethoxysilane, available from Wacker, and Geniosil® XL 43, i.e. (3-isocyanatomethyl)trimethoxysilane, available from Wacker.

Polyurethanes having alkoxysilane end groups of formula (I) included in a proportion of at least 75% by weight in the composition (A), preferably in a proportion of at least 90% by weight, preferentially of at least 95% by weight, in the composition (A), are thus obtained.

These preferred forms are typically obtained by using the isocyanatosilane having the appropriate formula (VII).

The stages (ii-A) and (ii-B) described above are in particular carried out under anhydrous conditions, so as to prevent hydrolysis of the alkoxysilane groups. A typical temperature range for carrying out these reaction stages is from 30° C. to 120° C. and more particularly from 60° C. to 105° C.

Stage (ii-A) of the process is advantageously carried out in the presence of an organometallic catalyst.

Composition (A)

The abovementioned composition (A) can comprise:
from 75% to 100%, preferably from 85% to 100%, preferentially from 90% to 100%, advantageously from 95% to 100%, by weight, of polyurethane comprising two hydrolyzable end groups of alkoxysilane type of abovementioned formula (I); and
from 0% to 25%, preferably from 0% to 15%, preferentially from 0% to 10%, advantageously from 0% to 5%, by weight, of at least one polyurethane comprising one hydrolyzable end group of alkoxysilane type of abovementioned formula (II).

Preferably, the composition (A) does not comprise polyurethane of formula (II).

The abovementioned composition (A) can have a viscosity, measured at 100° C., of less than 10 000 Pa·s, preferentially of less than or equal to 1000 Pa·s, preferably of less than or equal to 300 Pa·s, more preferably of less than or equal to 200 Pa·s.

According to the invention, the number-average molar mass of the polyurethane comprising two hydrolyzable end groups of alkoxysilane type of formula (I) can be between 500 g/mol and 50 000 g/mol, preferably between 600 g/mol and 30 000 g/mol, preferentially between 4000 g/mol and 25 000 g/mol, for example between 8000 g/mol and 25 000 g/mol.

The polyurethane comprising two hydrolyzable end groups of alkoxysilane type of abovementioned formula (I) can have a viscosity, measured at 25° C., of less than or equal to 1000 Pa·s, preferably of less than or equal to 300 Pa·s, preferentially of less than or equal to 200 Pa·s.

The polyurethane comprising two hydrolyzable end groups of alkoxysilane type of abovementioned formula (I) can have a viscosity, measured at 100° C., of less than 10 000 Pa·s, preferentially of less than or equal to 1000 Pa·s, preferably of less than or equal to 300 Pa·s, more preferentially of less than or equal to 200 Pa·s.

According to one embodiment, in the abovementioned formula (I), m is less than or equal to 0.

According to another embodiment, in the abovementioned formula (I), m is equal to 10.

According to a preferred embodiment, in the abovementioned formula (I):
$R^3$ is the divalent methylene or n-propylene radical;
$R^4$ and $R^5$ each represent the methyl or ethyl radical; and/or
p is equal to 0 or 1.

According to a preferred embodiment, in the abovementioned formula (I):
$R^3$ is the n-propylene radical, and
the $-Si(R^4)_p(OR^5)_{3-p}$ group is the trimethoxysilyl radical.

In the abovementioned formula (I), when there are several $R^{al}$ radicals, the latter can be identical or different. Typically, when the composition (A-1-2) comprises a mixture of diol(s), the nature of $R^{al}$ can vary in the polyurethane of abovementioned formula (I).

In the abovementioned formula (I), when there are several $R^{ac}$ radicals, the latter can be identical or different. Typically, when the composition (A-1-1) comprises a mixture of dicarboxylic acid(s), the nature of $R^{ac}$ can vary in the polyurethane of abovementioned formula (I).

$R^{al}$ and $R^{ac}$ are in particular defined according to the diols and dicarboxylic acids, described above, employed in the polycondensation reaction.

Preferably, $R^{ac}$ results from a dicarboxylic acid having an acid number $I_A$ of greater than 200 mg KOH/g, preferably of greater than or equal to 300 mg KOH/g, preferably of greater than or equal to 400 mg KOH/g, preferentially of greater than or equal to 500 mg KOH/g, in particular of greater than or equal to 700 mg KOH/g and advantageously of greater than or equal to 800 mg KOH/g.

Preferably, $R^{al}$ results from a diol having a hydroxyl number $O_{OH}$ of greater than 220 mg KOH/g, in particular of greater than or equal to 500 mg KOH/g, preferably of greater than or equal to 700 mg KOH/g, more preferentially still of greater than or equal to 900 mg KOH/g.

2. Compatible Tackifying Resin (B)

As regards the tackifying resin or resins (B) which are included in the composition according to the invention, the term "compatible tackifying resin" is intended to denote a tackifying resin which, when it is mixed in 50%/50% proportions by weight with the composition (A), gives a substantially homogeneous mixture.

The composition according to the invention can comprise from 15% to 70% by weight of a compatible tackifying resin (B), preferably with a number-average molar mass of between 200 g/mol and 50 000 g/mol.

The resins (B) are advantageously chosen from:
(i) resins capable of being obtained by polymerization of terpene hydrocarbons and phenols, in the presence of Friedel-Crafts catalyst(s);
(ii) resins capable of being obtained by polymerization of a-methylstyrene, and optionally by reaction with phenols;
(iii) resins of natural origin or modified rosins (such as, for example, the rosin extracted from pine gum, wood rosin extracted from tree roots) and their derivatives which are hydrogenated, dimerized, polymerized or esterified by monoalcohols or polyols (such as, for example, glycerol or pentaerythritol);
(iv) acrylic resins having in particular a viscosity at 100° C. of less than 100 Pa·s;
(v) and their mixtures.

According to a preferred embodiment, the tackifying resin (B) is chosen from resins of type (i).

Such resins are commercially available and, among those of type (i), (ii), (iii) or (iv), mention may be made, for example, of the following products:

resin of type (i): Dertophene® 1510, available from DRT, having a number-average molar mass $M_n$ of approximately 870 Da; Dertophene® H150, available from DRT, having a number-average molar mass $M_n$ of approximately 630 Da; Sylvarez® TP 95, available from Arizona Chemical, having a number-average molar mass of approximately 1200 Da;

resin of type (ii): Norsolene® W100, available from Cray Valley, obtained by polymerization of α-methylstyrene without action of phenols, having a number-average molar mass of 900 Da; Sylvarez® 510, which is available from Arizona Chemical, having a number-average molar mass of approximately 1740 Da, the process for the production of which comprises the addition of phenols;

resin of type (iii): Sylvalite® RE 100, which is an ester of rosin and of pentaerythritol available from Arizona Chemical, and the number-average molar mass of which is approximately 1700 Da.

The number-average molar masses of the resins can be measured according to methods well known to a person skilled in the art, for example by size exclusion chromatography using a polystyrene-type standard.

The tackifying resin (B) can have a hydroxyl number $I_{OH}$ ranging from 10 to 300 mg KOH/g, preferably ranging from 100 to 200 mg KOH/g, preferentially ranging from 140 to 160 mg KOH/g. In particular, the tackifying resin (B) has a hydroxyl number having a value of 145 mg KOH/g.

The hydroxyl number of the tackifying resin represents the number of hydroxyl functional groups per gram of tackifying resin, and is expressed in the patent application in the form of the equivalent number of milligrams of potassium hydroxide per gram of tackifying resin (mg KOH/g) for the assay of the hydroxyl functional groups.

The content of tackifying resin(s) (B) can represent at least 25% by total weight of the adhesive composition of the invention, preferably from 25% to 79% by weight, preferentially from 30% to 70% by weight, advantageously from 35% to 60% by weight, more preferentially still from 40% to 55% by weight, of the total weight of said adhesive composition.

3. Crosslinking Catalyst (C)

The crosslinking catalyst (C) which can be used in the composition according to the invention can be any catalyst known to a person skilled in the art for the condensation of silanol. Mention may be made, as examples of such catalysts, of organic titanium derivatives, such as titanium acetylacetonate (available commercially under the name Tyzor® AA75 from DuPont), organic aluminum derivatives, such as the aluminum chelate (available commercially under the name K-KAT® 5218 from King Industries), or amines, such as 1,8-diazobicyclo[5.4.0]undec-7-ene or DBU.

The adhesive composition of the invention comprises from 0.01% to 5%, preferably from 0.01% to 3%, preferentially from 0.1% to 3%, by weight, for example from 1% to 3% by weight, of a crosslinking catalyst (C), with respect to the total weight of said adhesive composition.

The heat-crosslinkable adhesive composition according to the invention preferably comprises:

(a) from 20% to 75%, preferably from 30% to 64%, preferentially from 45% to 55%, by weight, of composition (A), said composition (A) as defined above comprising:

from 75% to 100%, preferably from 85% to 100%, preferentially from 90% to 100%, by weight, of polyurethane comprising two hydrolyzable end groups of alkoxysilane type of formula (I); and from 0% to 25%, preferably from 0% to 15%, by weight, of at least one polyurethane comprising one hydrolyzable end group of alkoxysilane type of formula (II); and (b) from 15% to 79%, preferably from 35% to 69%, preferentially from 40% to 60%, by weight, of tackifying resin (B) as defined above; and (c) from 0.01% to 5%, preferably from 0.1% to 3%, preferentially from 1% to 3%, by weight, of crosslinking catalyst (C) as defined above;

(d) from 0% to 20%, preferably from 0% to 15%, preferentially from 0% to 10%, by weight, of at least one additive chosen from the group consisting of solvents, pigments, dyes, adhesion promoters, plasticizers, UV stabilizers, antioxidants, glitter, fluorescent materials, rheological additives, dehydration inhibitors, inorganic or organic fillers, and their mixtures.

4. Other Ingredients of the Composition According to the Invention

Optionally, the composition according to the invention can also include thermoplastic polymers often used in the preparation of HMPSAs, such as Ethylene/Vinyl Acetate (EVA) or styrene block copolymers.

The heat-crosslinkable adhesive composition according to the invention can additionally comprise up to 3% by weight of a hydrolyzable alkoxysilane derivative, as drying agent, and preferably a trimethoxysilane derivative. Such an agent advantageously extends the storage life of the composition according to the invention during storage and transportation before its use. Mention may be made, for example, of γ-methacryloyloxypropyltrimethoxysilane, available under the trade name Silquest® A-174 from Momentive Performance Materials.

The composition according to the invention can also include a plasticizer, such as a phthalate or a benzoate, a paraffinic or naphthenic oil (such as Primal® 352 from Esso), or also a wax of a polyethylene homopolymer (such as A-C® 617 from Honeywell), or a wax of a copolymer of polyethylene and of vinyl acetate, or also pigments, dyes or fillers.

Finally, an amount of 0.1% to 2% of one or more stabilizers or antioxidants is preferably included in the composition according to the invention. These compounds are introduced in order to protect the composition from degradation resulting from a reaction with oxygen which is liable to be formed by the action of heat or of light. These compounds can include antioxidants, which trap free radicals, such as, for example, Irganox® 245 and Irganox® 1010, or Irgafos® 168. These antioxidants can be used alone or in combination with other antioxidants or UV stabilizers.

The composition according to the invention can contain at least one filler, typically an organic and/or inorganic filler, preferably in a content of between 1% and 20% by weight of the total composition.

Use may be made, as organic filler(s), of any organic filler(s) and in particular polymeric filler(s) typically used in the field of adhesive compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may in particular be made of hollow microspheres made of vinylidene chloride/acrylonitrile.

The mean particle size of the filler(s) which can be used is preferably less than or equal to 10 microns, more preferentially less than or equal to 3 microns, in order to prevent them from settling in the composition according to the invention during its storage.

The mean particle size is measured for a volume particle size distribution corresponding to 50% by volume of the sample of particles analyzed. When the particles are spherical, the mean particle size corresponds to the median diameter (D50 or Dv50), which corresponds to the diameter such that 50% of the particles by volume have a size which is smaller than said diameter. In the present patent application, this value is expressed in micrometers and determined according to the standard NF ISO 13320-1 (1999) by laser diffraction on an appliance of Malvern type.

Preferably, the filler is an inorganic filler.

The inorganic fillers can be provided in the form of particles of diverse geometry. They can, for example, be spherical or fibrous or exhibit an irregular shape.

According to one embodiment, the filler is chosen from sand, glass beads, glass, quartz, barite, alumina, mica, talc, alkali metal or alkaline earth metal carbonates, and their mixtures.

Preferably, the filler is chosen from sand and glass beads, and calcium carbonate.

The sand which can be used in the present invention preferably has a particle size ranging from 0.1 to 400 µm, preferentially from 1 to 400 µm, more preferably from 10 to 350 µm, more preferably from 50 to 300 µm.

The glass beads which can be used in the present invention preferably have a particle size ranging from 0.1 to 400 µm, preferentially from 1 to 400 µm, more preferably from 10 to 350 µm, more preferably from 50 to 300 µm.

The calcium carbonate can be rendered hydrophobic, for example with calcium stearate or an analog, making it possible to confer a partial or complete hydrophobicity on the calcium carbonate particles. The more or less hydrophobic character of calcium carbonate can have an impact on the rheology of the composition. Moreover, the hydrophobic coating can make it possible to prevent the calcium carbonate from absorbing the constituents of the composition and from rendering them ineffective. The hydrophobic coating of the calcium carbonate can represent from 0.1% to 3.5% by weight, with respect to the total weight of calcium carbonate.

The calcium carbonate which can be used in the present invention preferably has a particle size ranging from 0.1 to 400 µm, more preferably from 1 to 400 µm, preferentially from 10 to 350 µm, more preferably from 50 to 300 µm.

Mention may be made, by way of example of calcium carbonate, of Mikhart® 1T (available from La Provençale).

When a pigment is present in the composition, its content is preferably less than or equal to 20% by weight, more preferably less than or equal to 15% by weight, with respect to the total weight of the composition. When it is present, the pigment can, for example, represent from 0.1% to 20% by weight, preferably from 0.5% to 10% by weight, of the total weight of the composition.

The pigments can be organic or inorganic pigments.

For example, the pigment is $TiO_2$, in particular Kronos® 2160, sold by Kronos, or also the pigment can be carbon black, in particular Printex® 25, sold by Evonik.

5. Preparation of the Composition According to the Invention

The heat-crosslinkable adhesive composition according to the invention can be prepared by a process which comprises:
- a stage of mixing, with the exclusion of air, preferably under an inert atmosphere, the abovementioned composition (A) with the tackifying resin(s) (B), at a temperature of between 50° C. and 170° C., preferably between 100° C. and 170° C., then
- a stage of cooling said mixture to a temperature ranging from 50° C. to 90° C., and advantageously of approximately 70° C., then
- a stage of incorporation, in said mixture, of the catalyst (C) and, if appropriate, of the other optional components.

There is thus advantageously obtained a composition, the Brookfield viscosity of which, measured at 100° C., is less than or equal to 1000 Pa·s, preferably less than 500 Pa·s, preferentially less than or equal to 100 Pa·s, more preferentially less than or equal to 50 Pa·s, for example less than or equal to 20 Pa·s, rendering it capable of the coating thereof on a support layer. Said viscosity is measured, according to the standard DIN ISO 2555, by a Brookfield RTV viscometer equipped with the Thermosel system intended for high-temperature viscosity measurements, provided with an A27 spindle rotating at a speed suited to the sensitivity of the sensor (on average 10 rev/min).

The adhesive composition according to the invention is advantageously stable within the field of application of said adhesive composition and in particular at elevated temperatures, advantageously making possible a better durability of said composition.

The adhesive compositions according to the invention advantageously result, after coating on a support followed by crosslinking, in an adhesive joint (providing the attachment of the self-adhesive article thus obtained to a substrate) which retains the required cohesion over a broad temperature range, in particular within a range extending from −60° C. to more than 200° C. This maintenance of the cohesion advantageously makes it possible for the self-adhesive article obtained to maintain its adhesiveness over this broad temperature range, in particular at elevated temperature, such as a temperature of greater than or equal to 140° C., indeed even of greater than or equal to 160° C., advantageously of greater than or equal to 180° C.

The adhesive composition according to the invention advantageously results in a self-adhesive article exhibiting a good compromise between good adhesiveness, good immediate tack, good resistance to shearing actions and/or good cohesion over a broad temperature range, in particular at elevated temperature, such as a temperature of greater than or equal to 140° C., indeed even of greater than or equal to 160° C.

The adhesive composition according to the invention results in a self-adhesive article advantageously exhibiting a high resistance to shearing actions, for example under a stress of greater than 3 kg, preferably of greater than 5 kg, indeed even of greater than or equal to 6 kg, over a broad temperature range, in particular at elevated temperature, such as a temperature of greater than or equal to 140° C., indeed even of greater than or equal to 160° C., or advantageously of greater than or equal to 180° C.

The adhesive composition advantageously exhibits a good compatibility with tackifying resins and it is advantageously easy to apply on a support. The adhesive composition according to the invention advantageously makes possible good wetting and thus better adhesion to a substrate.

6. Self-Adhesive Article

Another subject matter of the present invention is a self-adhesive article comprising a support layer coated with a self-adhesive layer, said self-adhesive layer consisting of an adhesive composition according to the invention in the crosslinked state.

Within the meaning of the present invention, the term "self-adhesive article" includes any article which can be adhesively bonded to a surface solely by the action of pressure with the hand or an item of equipment, without the use of additional glues or adhesives. The expression "self-adhesive article" also comprises the expression "pressure-sensitive adhesive article" or "PSA article". These articles have in particular the aim of being applied to a surface to be adhesively bonded so as to bring together, maintain, fix, or simply immobilize, or expose forms, logos, images or information. These articles can be used in many fields, such as the medical field, clothing, packaging, motor vehicles (for example for installing logos, lettering, interior soundproofing, interior fitting, adhesive bonding in the passenger compartment) or construction (for example for sound and thermal insulation, the assembling of windows). They can be fashioned as a function of their final application, for example in the form of tapes, such as tapes for industrial use, tapes for do-it-yourself work or for fixing use on worksites, single-sided or double-sided tapes, or in the form of labels, bandages, dressings, patches or graphic films.

According to one embodiment, the self-adhesive article is a self-adhesive multilayer system, and in particular a self-adhesive label or tape, which can be single-sided or double-sided.

The material which can be used for the support layer can, for example, be any type of rigid or flexible support. Mention may be made, for example, of supports of the type of foams, felts, nonwoven supports, plastics, membranes, papers or a film of a polymer material with one or more layers.

The support layer is made of a material for example chosen from:
- polyolefins, such as polyethylene, including high-density polyethylene, low-density polyethylene, linear low-density polyethylene and linear ultra-low-density polyethylene, polypropylene and polybutylenes,
- polystyrene,
- natural or synthetic rubber,
- vinyl copolymers, such as plasticized or non-plasticized polyvinyl chloride, and poly(vinyl acetate)s,
- olefinic copolymers, such as ethylene/methacrylate copolymers, ethylene/vinyl acetate copolymers, acrylonitrile/butadiene/styrene copolymers and ethylene/propylene copolymers,
- acrylic polymers and copolymers,
- polyurethanes,
- polyethers,
- polyesters, and
- the mixtures of these.

Preferably, the support layer is based on acrylic polymers, on polyethylene (PE), polypropylene (PP), which is oriented, non-oriented or biaxially oriented, polyimide, polyurethane, polyester, such as polyethylene terephthalate (PET), or on paper.

According to one embodiment, the self-adhesive article obtained from the adhesive composition according to the invention comprises a permanent support layer coated with an adhesive layer. Preferably, the adhesive layer is in addition coated with a nonstick protective plastic or paper film, which is preferably silicone-treated.

As an alternative to the nonstick protective film, the back face of the permanent support layer, which is not coated with the adhesive layer, can have a nonstick surface, for example a silicone-treated protective layer.

According to one embodiment, the permanent support layer is coated on both its faces with an adhesive composition, which can be identical or different, at least one of the two adhesive compositions being according to the invention.

Preferably, the support layer exhibits a thickness ranging from 10 microns to 50 mm, more preferably ranging from 10 microns to 20 mm, preferably ranging from 20 microns to 10 mm, more preferably ranging from 20 microns to 1 mm.

In certain specific cases, it is necessary to perform a surface treatment on the support layer to increase the attachment of the adhesive layer during the stage of coating thereon.

The self-adhesive article according to the invention can thus adhesively bond two substrates. The substrate onto which the self-adhesive article is intended to be applied (denoted by "substrate to be adhesively bonded") can be flexible or rigid. In particular, it can exhibit the same flexibility properties as the support layer described above, so as to be rolled up and packaged in the form of a reel, for example as described above.

Alternatively, the substrate to be adhesively bonded can be rigid. In this case, the substrate cannot be rolled up and packaged in the form of a reel, for example as described above.

The substrate to be adhesively bonded can, for example, be chosen from concrete, paper, substrates of polyolefin type, and the like.

According to one embodiment of the invention, the self-adhesive article additionally comprises a nonstick protective layer (release liner).

According to one embodiment, said nonstick layer is applied to the adhesive layer, after crosslinking of the adhesive composition.

The support layer can be covered on one of its two faces, the back face which is not coated with the adhesive layer, with a nonstick protective layer, for example with a silicone-treated film. In this way, the self-adhesive article can be wound around itself and then unwound without any problem by virtue of the absence of adhesion of the adhesive layer to the silicone-treated face.

The self-adhesive article according to the invention can be capable of being obtained by the process comprising the following stages:
(a) the conditioning of the adhesive composition according to the invention as defined above at a temperature ranging from 20° C. to 130° C.; then
(b) the coating, with the adhesive composition obtained in stage (a), of a carrying surface; then
(c) the crosslinking of the coated adhesive composition, by heating to a temperature ranging from 20° C. to 200° C., in particular in a gaseous environment where water molecules are present between 10 and 200 mg per m$^3$ of gas;
(d) the laminating or the transfer of the crosslinked adhesive layer onto a support layer or onto a nonstick protective film, it being possible for said support layer or nonstick film to be the reverse side of the carrying surface.

Within the meaning of the present invention, the term "carrying surface" should be understood as meaning either a belt conveyor coated with a nonstick layer, or a nonstick protective film (release liner), or a support layer. Thus, the carrying surface is made to become an integral part of the self-adhesive article, either as nonstick protective film, or as support layer.

In the case where the carrying surface is not a support layer, the process for obtaining the self-adhesive article according to the invention comprises the stage (d) of transferring the crosslinked adhesive layer onto a support layer.

In the case where the carrying surface is a support layer, the process for obtaining the self-adhesive article according to the invention can comprise the stage (d) of laminating the adhesive layer onto a nonstick protective film.

According to a preferred alternative form of the invention, stage (d) of the process described above consists in transferring the crosslinked adhesive layer onto a flexible support layer (which can be a plastic film) after cooling the crosslinked adhesive layer to a temperature below the degradation temperature or softening point of the material of which the support layer is composed.

According to one embodiment, the self-adhesive article according to the invention is capable of being obtained by the process as described above, not comprising a stage of pretreatment of the surface of the support layer. These pretreatments are targeted at chemically and/or physically modifying said surface, in order to increase the surface energy and/or the roughness of said surface, and thus to improve the adhesion of the adhesive layer to said surface. Mention may be made, by way of example of known surface treatments, of a plasma or corona treatment, abrasion or also application to said surface of a chemical attachment agent (also known as a primer) capable of conferring a high surface energy on the substrate coated with said agent.

According to one embodiment, the process for the manufacture of the self-adhesive article according to the invention additionally comprises a stage (e) of coating a second layer of adhesive composition according to the invention onto the support layer, followed by a stage (f) of crosslinking the adhesive composition coated in stage (e) by heating to a temperature ranging from 20° C. to 200° C. According to this embodiment, a double-sided self-adhesive article is obtained.

The coating stage (b) can be carried out by means of known coating devices, such as, for example, a lip nozzle or a nozzle of curtain type, or else with a roller. It employs a weight per unit area of adhesive composition ranging from 3 to 2000 g/m², preferably from 5 to 1000 g/m², more preferably from 10 to 500 g/m² or more preferentially from 12 to 250 g/m².

The weight per unit area of adhesive composition necessary for the manufacture of self-adhesive labels can range from 10 to 100 g/m², preferably from 20 to 50 g/m². That necessary for the manufacture of self-adhesive tapes can vary within a much wider range extending from 3 to 500 g/m², preferably from 15 to 250 g/m², per face.

According to one embodiment, the coated adhesive composition is additionally subjected, during stage (c), to a treatment in a humid atmosphere characterized by its humidity level. Preferably, the humid atmosphere is an atmosphere in which from 2% to 100% of the molecules are water molecules, preferably from 4% to 50%, more preferably from 5% to 10%, of the molecules are water molecules.

The humidity level is expressed as percentage of water per unit of volume, which corresponds to the number of water molecules divided by the total number of molecules in a unit of volume. By virtue of the linear nature of this scale, the humidity level is easily measured and monitored by using, for example, monitors of P.I.D (Proportional-Integral-Derivative) type. The percentage by weight can be calculated by multiplying the percentage of the number of water molecules with respect to the total number of molecules by a factor of 0.622. General information on the humidity level in various environments is described by W. Wagner et al. in "International Steam Tables—Properties of Water and Steam based on the Industrial Formulation IAPWS-IF97".

The time necessary for the crosslinking of stage (c) can vary within wide limits, for example between 1 second and 30 minutes, depending on the weight per unit area of adhesive composition deposited on the carrying surface, on the heating temperature and on the humidity.

This thermal crosslinking stage has the effect of creating—between the polymeric chains having hydrolyzable alkoxysilane end groups of the composition (A) and under the action of atmospheric moisture—bonds of siloxane type which result in the formation of a three-dimensional polymeric network. The adhesive composition thus crosslinked is in particular a pressure-sensitive adhesive which confers, on the support layer which is coated with it, the desirable adhesiveness and tack.

Preferably, the coating is carried out uniformly over the support layer or over the nonstick protective layer, but the coating can also be adapted to the desired shape of the final self-adhesive article.

According to one embodiment, the coating with the adhesive composition is carried out over at least a part of the two faces of the support layer. If the two faces of the support layer are coated, the adhesive composition can be identical or different on the two faces and the weight per unit area can be identical or different on the two faces.

According to one embodiment of the invention, the self-adhesive article comprises an adhesive layer over at least a part of one face or over at least a part of the two faces of the support layer, said adhesive layer(s) optionally being coated with a nonstick protective layer. According to one embodiment, the self-adhesive article comprises two nonstick protective layers on each of the two adhesive layers. In this case, the two protective layers can be made of identical or different materials and/or they can have an identical or different thickness.

The self-adhesive article according to the invention can be used in an adhesive bonding method comprising the following stages:

a) removing the nonstick protective layer, when such a layer is present;

b) applying the self-adhesive article to a surface of a product; and c) applying a pressure to said article.

In stage b), the self-adhesive article is applied so that the self-adhesive part of the article (formed by the self-adhesive layer) is facing the surface of the product.

According to an embodiment in which the self-adhesive article is a double-sided article, the adhesive bonding method additionally comprises a stage in which either a second surface of a product is applied to the article adhesively bonded to the first surface of a product, or the article adhesively bonded to the first surface of a product is applied to a second surface of a product.

All the embodiments described above can be combined with one another. In particular, the various abovementioned constituents of the adhesive composition, and especially the preferred embodiments of the composition, can be combined with one another.

In the context of the invention, the term "of between x and y", "ranging from x to y" or "extending from x to y" is understood to mean an interval in which the limits x and y are included. For example, the range "of between 0% and 25%" includes in particular the values 0% and 25%.

The following examples are given purely by way of illustration of the invention and should not be interpreted in order to limit the scope thereof.

EXAMPLES

The following ingredients were used in the examples:
Kuraray P6010: sold by Kuraray, corresponding to a polyester diol of formula (III) having a $I_{OH}$ of approximately 19 mg KOH/g (obtained from adipic acid and 3-methyl-1,5-pentanediol);
Kuraray P10010: sold by Kuraray, corresponding to a polyester diol of formula (III) and having a $I_{OH}$ of approximately 11 mg KOH/g (obtained from adipic acid and 3-methyl-1,5-pentanediol);
Dynacoll® 7250: sold by Evonik, corresponding to a polyester diol of formula (III) having a $I_{OH}$ of between 18 and 24 mg KOH/g (obtained in particular from adipic acid and 1,6-hexanediol);
Silquest® A-Link 35: sold by Momentive, corresponding to an isocyanatosilane of abovementioned formula (VII) in which p is equal to 0, $R^5$ is a methyl and $R^3$ is a propylene;
Borchi Kat® VP 0244: commercially available from Borchers, catalyst of bismuth/zinc neodecanoate type;
Dertophene® H150: available from DRT, corresponding to a tackifying resin of terpene phenolic type;
Irganox® 1010: available from BASF, corresponding to an antioxidant of hindered phenol type;
Irgafos® 168: available from BASF, corresponding to an antioxidant of phosphite type;
Irganox® 245: available from BASF, is a hindered phenolic antioxidant of the ethylenebis(oxyethylene) bis[3-(5-tert-butyl-4-hydroxy-m-tolyl) propionate] type;
K-Kat® 5218: available from King Industries, corresponding to a catalyst of aluminum chelate type;
Reagem 5110: available from DRT, is a tackifying resin of polyester polyol type having a hydroxyl number of 65 mg KOH/g.

Examples A, B and C illustrate the preparation of composition (A) comprising at least one polyurethane of formula (I) in which $R^3$ is the propylene radical and $R^5$ is the methyl radical.

Example A: Preparation of a Composition ($A_1$)

The following are introduced into a glass reactor:
747.8 g (0.1259 mol) of the polyester polyol Kuraray P6010 (poly[(3-methyl-1,5-pentanediol)-ali-(adipic acid)])
52 g (0.253 mol) of Silquest® A-Link 35 ((y-isocyanato-n-propyl)trimethoxysilane), corresponding to an NCO/OH (functional groups) ratio equal to 1; and
250 ppm of a catalyst of bismuth/zinc neodecanoate type (Borchi Kat VP 0244).

The mixture was stirred continuously at a temperature of 85° C. and under nitrogen until the NCO functional groups of the isocyanatosilane Silquest® A-Link 35 had completely reacted. The disappearance of the NCO functional group is observed using the Fourier transform infrared technique, the peak corresponding to the NCO functional group (between 2260-2270 cm$^{-1}$) no longer being present on the infrared spectrum when everything has reacted.

Approximately 800 grams of a composition having a viscosity of 142 Pa·s at 23° C. (measured with a Brookfield viscometer with a spindle rotating at the rate of 20 rev/min) are obtained.

Example B: Preparation of a Composition ($A_2$)

The following are introduced into a glass reactor:
777.08 g (0.1412 mol) of the polyester polyol Dynacoll 7250;
62.66 g (0.305 mol) of Silquest® A-Link 35 ((y-isocyanato-n-propyl)trimethoxysilane), corresponding to an NCO/OH (functional groups) ratio equal to 1; and
250 ppm of a catalyst of bismuth/zinc neodecanoate type (Borchi Kat VP 0244).

The mixture was stirred continuously at a temperature of 85° C. and under nitrogen until the NCO functional groups of the isocyanatosilane Silquest® A-Link 35 had completely reacted. The disappearance of the NCO functional group (between 2260-2270 cm$^{-1}$) is observed using the Fourier transform infrared technique, the peak corresponding to the NCO functional group no longer being present on the infrared spectrum when everything has reacted.

Approximately 840 grams of a composition having a viscosity of 101 Pa·s at 23° C. (measured with a Brookfield viscometer with a spindle rotating at the rate of 20 rev/min) are obtained.

Example C: Preparation of a Composition ($A_3$)

The following are introduced into a glass reactor:
750 g (0.0749 mol) of the polyester polyol Kuraray P10010 (poly[(3-methyl-1,5-pentanediol)-ali-(adipic acid)])
32.63 g (0.159 mol) of Silquest® A-Link 35 ((y-isocyanato-n-propyl)trimethoxysilane), corresponding to an NCO/OH (functional groups) ratio equal to 1; and
250 ppm of a catalyst of bismuth/zinc neodecanoate type (Borchi Kat VP 0244).

The mixture was stirred continuously at a temperature of 85° C. and under nitrogen until the NCO functional groups of the isocyanatosilane Silquest® A-Link 35 had completely reacted. The disappearance of the NCO functional group is observed using the Fourier transform infrared technique, the peak corresponding to the NCO functional group (between 2260-2270 cm$^{-1}$) no longer being present on the infrared spectrum when everything has reacted.

Examples 1 to 3 illustrate the preparation of the heat-crosslinkable adhesive compositions from the compositions ($A_1$), ($A_2$) and ($A_3$).

Example 1

1A: Preparation of a Heat-Crosslinkable Adhesive Composition C1 Based on Composition ($A_1$)

The composition C1 occurring in the following table 1 is prepared by first of all introducing the tackifying resin with the antioxidants into a glass reactor under vacuum and heated to approximately 160° C. Then, once the resin has melted, the composition ($A_1$) is added in stages so as to obtain, after each addition, a substantially homogeneous mixture. Once the addition of the composition ($A_1$) has finished, the mixture is stirred under vacuum for 15 minutes and then cooled to 80° C. The catalyst is then introduced. The mixture is kept under vacuum and with stirring for an additional 10 minutes.

TABLE 1

| Composition C1 | |
| --- | --- |
| Composition (A$_1$) | 51.5 |
| Dertophene H150 | 45.5 |
| K-Kat ® 5218 | 2 |
| Irganox ® 1010 | 0.7 |
| Irgafos ® 168 | 0.3 |
| Brookfield viscosity at 100° C. (Pa · s) | 3.3 |
| Skin time (seconds) | 250 |

The amounts expressed are percentages by weight, with respect to the total weight of the composition C1.

1B: Preparation of a PET Support Layer Coated with the Crosslinked Composition, in the Proportion of a Weight Per Unit Area of 50 g/m$^2$ A rectangular sheet of polyethylene terephthalate (PET) with a thickness of 50 μm and with dimensions of 20 cm by 40 cm is used as support layer.

The composition obtained in 1A is preheated to a temperature of approximately 100° C. and is introduced into a cartridge, from where a strand is extruded which is deposited close to the edge of the sheet parallel to its width.

The composition included in this strand is subsequently distributed over the whole of the surface of the sheet, so as to obtain a uniform layer of substantially constant thickness. Use is made, for this, of a film drawer (also known as film applicator) which is moved from the edge of the sheet to the opposite edge. A layer of composition corresponding to a weight per unit area of 50 g/m$^2$ is thus deposited, which represents approximately a thickness of the order of 50 μm.

The PET sheet thus coated is then placed in an oven at 120° C. at controlled humidity for 8 to 10 minutes for the crosslinking of the composition and then laminated on a nonstick protective layer consisting of a silicone-treated film sheet which is rectangular and of the same dimensions.

The PET support layer thus obtained is subjected to the tests described below in example 5.

Example 2

2A: Preparation of a Heat-Crosslinkable Adhesive Composition C2 Based on Composition (A$_2$)

The composition C2 occurring in the following table 2 is prepared by first of all introducing the tackifying resin with the antioxidants into a glass reactor under vacuum and heated to approximately 150° C. Then, once the resin has melted, the composition (A$_2$) is added in stages so as to obtain, after each addition, a substantially homogeneous mixture. Once the addition of the composition (A$_1$) has finished, the mixture is stirred under vacuum for 15 minutes and then cooled to 80° C. The catalyst is then introduced. The mixture is kept under vacuum and with stirring for an additional 10 minutes.

TABLE 2

| Composition C2 | |
| --- | --- |
| Composition (A$_2$) | 51.5 |
| Dertophene H150 | 45.5 |
| K-Kat ® 5218 | 2 |
| Irganox ® 1010 | 0.7 |
| Irgafos ® 168 | 0.3 |
| Brookfield viscosity at 100° C. (Pa · s) | 14.3 |
| Skin time (seconds) | 130 |

The amounts expressed are percentages by weight, with respect to the total weight of the composition C2.

2B: Preparation of a PET Support Layer Coated with the Crosslinked Composition, in the Proportion of a Weight Per Unit Area of 50 q/m$^2$ A rectangular sheet of polyethylene terephthalate (PET) with a thickness of 50 μm and with dimensions of 20 cm by 40 cm is used as support layer.

The composition obtained in 2A is preheated to a temperature of approximately 100° C. and is introduced into a cartridge, from where a strand is extruded which is deposited close to the edge of the sheet parallel to its width.

The composition included in this strand is subsequently distributed over the whole of the surface of the sheet, so as to obtain a uniform layer of substantially constant thickness. Use is made, for this, of a film drawer (also known as film applicator) which is moved from the edge of the sheet to the opposite edge. A layer of composition corresponding to a weight per unit area of 50 g/m$^2$ is thus deposited, which represents approximately a thickness of the order of 50 μm.

The PET sheet thus coated is then placed in an oven at 120° C. at controlled humidity for 8 to 10 minutes for the crosslinking of the composition and then laminated on a nonstick protective layer consisting of a silicone-treated film sheet which is rectangular and of the same dimensions.

The PET support layer thus obtained is subjected to the tests described below in example 5.

Example 3

3A: Preparation of a Heat-Crosslinkable Adhesive Composition C3 Based on Composition (A$_3$)

The composition C3 occurring in the following table 3 is prepared by first of all introducing the tackifying resin with the antioxidants into a glass reactor under vacuum and heated to approximately 150° C. Then, once the resin has melted, the composition (A$_3$) is added in stages so as to obtain, after each addition, a substantially homogeneous mixture. Once the addition of the composition (A$_1$) has finished, the mixture is stirred under vacuum for 15 minutes and then cooled to 80° C. The catalyst is then introduced. The mixture is kept under vacuum and with stirring for an additional 10 minutes.

TABLE 3

| Composition (A$_2$) | 51.5 |
| --- | --- |
| Dertophene H150 | 45.5 |
| K-Kat ® 5218 | |
| | 0.7 |
| Irgafos ® 168 | 0.3 |
| Brookfield viscosity at 100° C. (Pa · s) | 67 |
| Skin time (seconds) | 80 |

The amounts expressed are percentages by weight, with respect to the total weight of the composition C3.

3B: Preparation of a PET Support Layer Coated with the Crosslinked Composition, in the Proportion of a Weight Per Unit Area of 50 q/m$^2$ A rectangular sheet of polyethylene terephthalate (PET) with a thickness of 50 μm and with dimensions of 20 cm by 40 cm is used as support layer.

The composition obtained in 3A is preheated to a temperature of approximately 100° C. and is introduced into a cartridge, from where a strand is extruded which is deposited close to the edge of the sheet parallel to its width.

The composition included in this strand is subsequently distributed over the whole of the surface of the sheet, so as to obtain a uniform layer of substantially constant thickness. Use is made, for this, of a film drawer (also known as film applicator) which is moved from the edge of the sheet to the opposite edge. A layer of composition corresponding to a weight per unit area of 50 g/m² is thus deposited, which represents approximately a thickness of the order of 50 µm.

The PET sheet thus coated is then placed in an oven at 120° C. at controlled humidity for 8 to 10 minutes for the crosslinking of the composition and then laminated on a nonstick protective layer consisting of a silicone-treated film sheet which is rectangular and of the same dimensions.

The PET support layer thus obtained is subjected to the tests described below in example 5.

Example 4

4A: Preparation of a Heat-Crosslinkable Adhesive Composition C4 Based on Composition ($A_1$)

The composition C4 occurring in the following table 4 is prepared by first of all introducing the tackifying resin with the antioxidants into a glass reactor under vacuum and heated to approximately 160° C. Then, once the resin has melted, the composition ($A_1$) is added in stages so as to obtain, after each addition, a substantially homogeneous mixture. Once the addition of the composition ($A_1$) has finished, the mixture is stirred under vacuum for 15 minutes and then cooled to 80° C. The catalyst is then introduced. The mixture is kept under vacuum and with stirring for an additional 10 minutes.

TABLE 4

| Composition C4 | |
| --- | --- |
| Composition ($A_1$) | 51 |
| Reagem 5110 | 46 |
| K-Kat ® 5218 | 2 |
| Irganox ® 1010 | 0.75 |
| Irgafos ® 245 | 0.25 |
| Brookfield viscosity at 100° C. (Pa · s) | 9000 |

The amounts expressed are percentages by weight, with respect to the total weight of the composition C4.

4B: Preparation of a PET Support Layer Coated with the Crosslinked Composition, in the Proportion of a Weight Per Unit Area of 50 g/m²

A rectangular sheet of polyethylene terephthalate (PET) with a thickness of 50 µm and with dimensions of 20 cm by 40 cm is used as support layer.

The composition obtained in 4A is preheated to a temperature of approximately 100° C. and is introduced into a cartridge, from where a strand is extruded which is deposited close to the edge of the sheet parallel to its width.

The composition included in this strand is subsequently distributed over the whole of the surface of the sheet, so as to obtain a uniform layer of substantially constant thickness. Use is made, for this, of a film drawer (also known as film applicator) which is moved from the edge of the sheet to the opposite edge. A layer of composition corresponding to a weight per unit area of 50 g/m² is thus deposited, which represents approximately a thickness of the order of 50 µm.

The PET sheet thus coated is then placed in an oven at 120° C. at controlled humidity for 8 to 10 minutes for the crosslinking of the composition and then laminated on a nonstick protective layer consisting of a silicone-treated film sheet which is rectangular and of the same dimensions.

The PET support layer thus obtained is subjected to the tests described below in example 5.

Example 5: Tests

180° Peel Test on a Sheet of Stainless Steel:

The adhesiveness is evaluated by the 180° peel test on a sheet of stainless steel, as described in the FINAT No. 1 method, published in the FINAT Technical Handbook, 6th edition, 2001. FINAT is the International Federation for Self-Adhesive Label Manufacturers and Converters. The principle of this test is as follows:

A test specimen in the form of a rectangular strip (25 mm×175 mm) is cut out from the PET support layer coated with the crosslinked composition obtained in example 1 (2, 3 or 4 respectively). This test specimen is attached over ⅔ of its length (after removal of the corresponding portion of nonstick protective layer) to a substrate consisting of a sheet of stainless steel. The assemblage obtained is aged at the desired temperature for 24 h. The peeling is carried out after cooling at 23° C. and 50% relative humidity for one hour. To this end, the assemblage is then placed in a tensile testing device capable, starting from the end of the rectangular strip which has remained free, of carrying out the peeling or detachment of the strip under an angle of 180° and with a rate of separation of 300 mm per minute. The device measures the force required to detach the strip under these conditions.

The results are expressed in N/cm and are shown in the following table for different aging temperatures:

| Aging temperature (° C.) | Composition C1 | Composition C2 | Composition C3 | Composition C4 |
| --- | --- | --- | --- | --- |
| 23° C. | 10.8 | 14 | 8.8 | 8.7 |
| 90° C. | 12.8 | 22 | 9.2 | n.d. |
| 120° C. | 12.8 | 22 | 8.8 | n.d. |
| 140° C. | 14.4 | 22 | 8.4 | 11.6 |
| 160° C. | 16 | Failure PET support | 14.4 | n.d. |
| 180° C. | Failure PET support | Failure PET support | Failure PET support | n.d. | n.d.: not determined

It emerges from this table that the compositions C1, C2, C3 and C4 according to the invention advantageously provide a high peel strength (for detaching the strip) over a broad temperature range and in particular for temperatures of greater than or equal to 120° C., indeed even of greater than or equal to 140° C. These results convey that the adhesive joint advantageously resists up to high temperatures. After agings at very high temperatures, 160° C. and 180° C., failures of PET support are observed, which show that the cohesion and the adhesion of the adhesive film are greater than the cohesion of the 50 µm PET support. This observation demonstrates an excellent resistance to very high temperatures of the heat-crosslinkable self-adhesive compositions according to the invention.

Test 4h "Heavy Weight Shear"

The internal cohesion of the adhesive is evaluated by the shear test at ambient temperature under constant stress for a period of time of 4 hours. The preparation of the test plates is described in the PSTC 107 method, published in the PSTC Technical Manual (15th edition) of the Pressure Sensitive Tape Council.

The principle of this test is as follows:

A test specimen in the form of a rectangular strip (25 mm×125 mm) is cut out from the PET support layer coated with the crosslinked adhesive composition constituting the self-adhesive article obtained above. This test specimen is subsequently stored at 23° C. and 50% relative humidity for 24 hours and then attached (after removing the corresponding portion of nonstick protective layer) to a stainless steel plate prepared beforehand, as described in the PSTC 107 method. The adhesive bonding surface is 25×25 mm, i.e. 625 mm². The remaining part of the nonstick layer is subsequently removed, so as to be able to install the system for attachment of the weights to the free part of the test specimen which protrudes from the plate. The system for attaching the weights consists of a hook positioned at 5 cm from the test specimen/stainless steel adhesive bonding surface which is held by sticking the test specimen back over itself and reinforced so as to be able to withstand the weights ranging up to 8 kg or 80 N, this being the case without breaking throughout the duration of the test.

The assemblage obtained is left for a minimum of 60 minutes at ambient temperature (23° C.) and then placed on a static shear test stand, as described in the PSTC 107 method (procedure A): the stainless steel plate is attached vertically with an angle of 2°, a single and unvarying weight is attached to the hook of the test specimen and the test is started up for a duration of 4 h. At the end of these 4 hours, if the test specimen has not moved by more than 2 mm (creep), the weight is increased by 1 kg on a new test specimen prepared with the same methodology. If the specimen has moved by more than 2 mm after a period of 4 h, the value recorded is that of the lower weight for which the test specimen did not move.

The results are expressed in kg and are shown in the following table for different aging temperatures:

| Aging temperature (° C.) | Composition C1 (kg) | Composition C2 (kg) | Composition C3 (kg) |
|---|---|---|---|
| 23° C. | 8 | 8 | 8 |
| 90° C. | 8 | 8 | 8 |
| 120° C. | 8 | 8 | 8 |
| 140° C. | 8 | 8 | 8 |
| 160° C. | 8 | 8 | 8 |
| 180° C. | 6 | 8 | 8 |

It emerges from this table that the compositions C1, C2 and C3 according to the invention advantageously provide high resistances to shearing actions over a broad temperature range and in particular for temperatures of greater than or equal to 120° C., indeed even of greater than or equal to 140° C. or even 160° C. These results convey that the adhesive joint advantageously resists up to high temperatures and under stresses of greater than or equal to 6 kg at 180° C.

The invention claimed is:

1. A heat-crosslinkable adhesive composition, comprising:
from 20% to 84% by weight of a composition (A) comprising:
from 75% to 100% by weight of at least one polyurethane comprising two end groups of alkoxysilane type which are hydrolyzable and having the following formula (I):

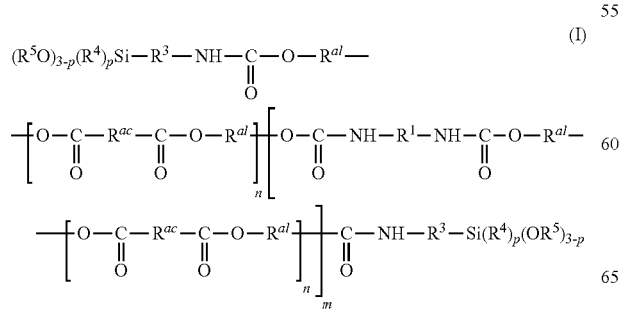

wherein:
$R^1$ represents a divalent hydrocarbon radical comprising from 5 to 15 carbon atoms which can be aromatic or aliphatic and linear, branched or cyclic;
$R^{al}$ represents a divalent hydrocarbon radical resulting from a saturated diol, by replacement of each of the two hydroxyl groups by a free valency, said diol having a hydroxyl number $I_{OH}$ of greater than 220 mg KOH/g;
$R^{ac}$ represents a divalent hydrocarbon radical resulting from a saturated dicarboxylic acid, by replacement of each of the two carboxyl —COOH groups by a free valency, said acid having an acid number $I_A$ of greater than 200 mg KOH/g;
n is a number such that the polyester diol of formula (III):

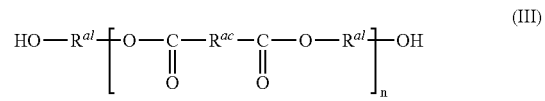

has a hydroxyl number $I_{OH}$ of between 4 and 24 mg KOH/g;
$R^{a1}$ represents a linear divalent alkylene radical comprising from 1 to 3 carbon atoms;
$R^{ac}$, which are identical or different, each represent a linear or branched alkyl radical of 1 to 4 carbon atoms, with the possibility, when there are several $R^{ac}$ radicals, that the latter are identical or different;
m is an integer such that the number-average molar mass of the polymer of formula (I) is between 400 g/mol and 50 000 g/mol;
p is an integer equal to 0, 1 or 2;
from 0% to 25% by weight of at least one polyurethane comprising one end group of alkoxysilane type which is hydrolyzable and having the following formula (II):

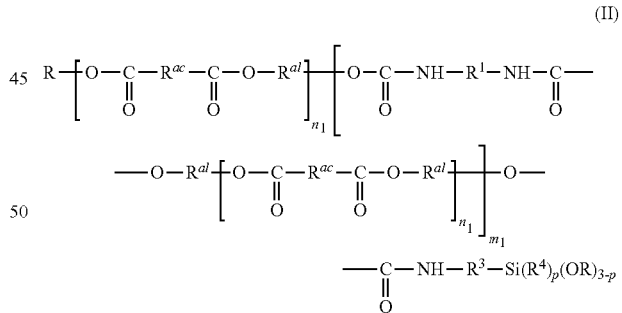

wherein:
$n_1$ and $m_1$ are each integers such that the number-average molar mass of the polyurethane of formula (II) is between 400 g/mol and 50 000 g/mol;
$R^{ac}$ and $R^{al}$ are as defined above; and
R represents a monovalent hydrocarbon radical resulting from a monol, by replacement of the hydroxyl group by a free valency;
said composition (A) being obtained by a process which comprises a stage of preparation of a composition (A-1) comprising an amorphous polyester diol of abovementioned formula (III) or a mixture of amorphous polyester diols of abovementioned formula (III), by reacting, by a polycondensation reaction:
(i) a composition (A-1-1) comprising at least one saturated dicarboxylic acid, said composition (A-1-1) having an acid number $I_A$ of greater than 200 mg KOH/g; and
(ii) a composition (A-1-2) comprising at least one saturated diol, said composition (A-1-2) having a hydroxyl number $I_{OH}$ of greater than 220 mg KOH/g; and
(iii) optionally a composition (A-1-3) comprising at least one monol;
provided that at least one saturated dicarboxylic acid of the composition (A-1-1) or at least one saturated diol of the composition (A-1-2) is branched;
the composition (A-1) having a hydroxyl number $I_{OH}$ of between 4 and 24 mg KOH/g;
from 15% to 79% by weight of a compatible tackifying resin (B), with a number-average molar mass of between 200 g/mol and 50 000 g/mol; and
from 0.01% to 5% by weight, of a crosslinking catalyst (C).

2. The composition as claimed in claim 1, wherein the saturated dicarboxylic acid of the composition (A-1-1) has an acid number $I_A$ of greater than or equal to 300 mg KOH/g.

3. The composition as claimed in claim 1, wherein the saturated diol of the composition (A-1-2) has a hydroxyl number $I_{OH}$ of greater than or equal to 500 mg KOH/g.

4. The composition as claimed in claim 1, wherein the number-average molar mass of the polyurethane comprising two hydrolyzable end groups of alkoxysilane type of formula (I) is between 500 g/mol and 50 000 g/mol.

5. The composition as claimed in claim 1, wherein the polyurethane comprising two hydrolyzable end groups of alkoxysilane type of formula (I) has a viscosity, measured at 100° C., of less than 10,000 Pa·s.

6. The composition as claimed in claim 1, wherein the amorphous polyester diol of formula (III) has a hydroxyl number Ice of between 7 and 24 mg KOH/g.

7. The composition as claimed in claim 1, wherein the amorphous polyester diol of formula (III) has a viscosity, measured at 23° C., of less than 10,000 Pa·s.

8. The composition as claimed in claim 1, wherein the amorphous polyester diol of formula (III) has a glass transition temperature $T_g$ of less than 0° C.

9. The composition as claimed in claim 1, wherein the amorphous polyester diol of formula (III) has a number-average molar mass of greater than or equal to 5500 g/mol.

10. The composition as claimed in claim 1, wherein at least one saturated diol of the composition (A-1-2) is branched.

11. The composition as claimed in claim 1, wherein the $R^1$ radical is chosen from one of the following divalent radicals, the formulae of which below show the two free valencies:

a) the divalent radical derived from isophorone diiscoyanante (IPDI):

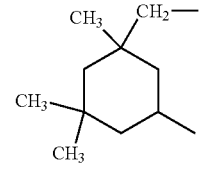

b)

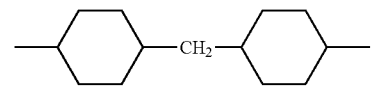

c) the radical derived from 2, 4- and 2, 6-tolune diisocyanate (TDI):

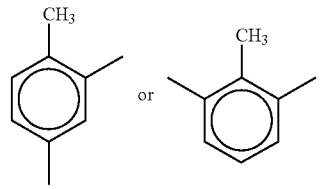

d) the radical derived from 4, 4'- and 2, 4'-diphenylmethane diisocyanate (MDI):

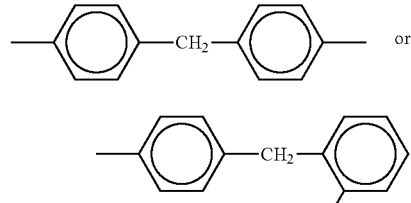

e) the radical derived from m-xylylene diisocyanate (m-XDI):

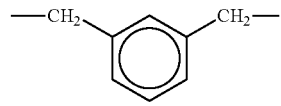

f) the radical derived from hexamethylene diisocyanate (HDI):

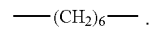

12. The composition as claimed in claim 1, wherein:
$R^3$ is the divalent methylene or n-propylene radical;
$R^4$ and $R^5$ each represent the methyl or ethyl radical; and/or
p is equal to 0 or 1.

13. The composition as claimed in claim 1, wherein the tackifying resin (B) has a hydroxyl number $I_{OH}$ ranging from 10 to 300 mg KOH/g.

14. The composition as claimed in claim 1, wherein the composition (A-1) additionally comprises at least one amorphous polyester monol of following formula (IV):

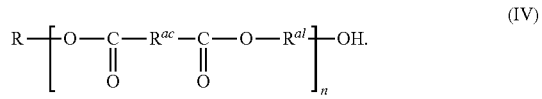

15. The composition as claimed in claim 1, wherein it comprises:
a) from 20% to 75%, by weight, of composition (A), said composition (A) comprising:
from 75% to 100%, by weight, of polyurethane comprising two hydrolyzable end groups of alkoxysilane type of formula (I); and
from 0% to 25%, by weight, of at least one polyurethane comprising one hydrolyzable end group of alkoxysilane type of formula (II); and
b) from 15% to 79%, by weight, of tackifying resin (B),
c) from 0.01% to 5%, by weight, of crosslinking catalyst (C);
d) from 0% to 20%, by weight, of at least one additive chosen from the group consisting of solvents, pigments, dyes, adhesion promoters, plasticizers, UV stabilizers, antioxidants, glitter, fluorescent materials, rheological additives, dehydration inhibitors, inorganic or organic fillers, and their mixtures.

16. The composition as claimed in claim 1, wherein it has a viscosity, measured at 100° C., of less than or equal to 1000 Pa·s.

17. A self-adhesive article comprising a support layer coated with a self-adhesive layer, said self-adhesive layer comprising the adhesive composition of claim 1 in the crosslinked state.

18. The self-adhesive article as claimed in claim 17, capable of being obtained by the process comprising the following stages:
 (a) conditioning of the adhesive composition at a temperature ranging from 20° C. to 130° C.; then
 (b) coating, with the adhesive composition obtained in stage (a), of a carrying surface; then
 (c) crosslinking the coated adhesive composition, by heating to a temperature ranging from 20° C. to 200° C., in a gaseous environment where water molecules are present between 10 and 200 mg per $m^3$ of gas; and
 (d) laminating or transferring the crosslinked adhesive layer onto a support layer or onto a nonstick protective film, wherein said support layer or nonstick film can be the reverse side of the carrying surface.

19. The composition of claim 1, wherein the compatible tackifying resin (B) is chosen from the following resins:
 i. capable of being obtained by polymerization of terpene hydrocarbons and phenols, in the presence of Friedel-Crafts catalyst(s);
 ii. capable of being obtained by polymerization of a-methylstyrene, and optionally by reaction with phenols;
 iii. rosins of natural origin or modified rosins and their derivatives which are hydrogenated, dimerized, polymerized or esterified by monoalcohols or polyols;
 iv. acrylic resins having in particular a viscosity at 100° C. of less than 100 Pa·s; or
 v. their mixtures.

20. The composition of claim 11, wherein said $R^1$ radical is the divalent radical derived from isophorone diisocyanate or from xylylene diisocyanate.

* * * * *